US010180084B2

(12) United States Patent
Denis et al.

(10) Patent No.: US 10,180,084 B2
(45) Date of Patent: Jan. 15, 2019

(54) STRUCTURAL CASE FOR AIRCRAFT GAS TURBINE ENGINE

(71) Applicant: Pratt & Whitney Canada Corp., Longueuil (CA)

(72) Inventors: David Denis, Burlington (CA); Andreas Eleftheriou, Woodbridge (CA); David Harold Menheere, Georgetown (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 120 days.

(21) Appl. No.: 15/209,050

(22) Filed: Jul. 13, 2016

(65) Prior Publication Data
US 2017/0114669 A1 Apr. 27, 2017

Related U.S. Application Data

(62) Division of application No. 13/431,121, filed on Mar. 27, 2012, now Pat. No. 9,498,850.

(51) Int. Cl.
*F01D 25/24* (2006.01)
*B23K 31/02* (2006.01)
*F01D 25/16* (2006.01)
*B23K 101/00* (2006.01)
(Continued)

(52) U.S. Cl.
CPC ............ *F01D 25/243* (2013.01); *B23K 31/02* (2013.01); *F01D 25/162* (2013.01); *B23K 2101/001* (2018.08); *B23K 2101/045* (2018.08); *B23K 2101/08* (2018.08); *F05D 2220/323* (2013.01);
(Continued)

(58) Field of Classification Search
CPC ........ F01D 25/24; F01D 25/243; F01D 25/28; F01D 25/162; B23K 2201/001; B23K 2201/045; B23K 2201/08; B23K 2101/001; B23K 2101/045; B23K 2101/08; B23K 31/02; Y02T 50/671; F05D 2220/323; F05D 2220/232; F05D 2300/10
See application file for complete search history.

(56) References Cited

U.S. PATENT DOCUMENTS 2,548,886 A * 4/1951 Howard .................. F01D 5/066
29/889.2
2,882,679 A * 4/1959 Karcher .................... F02K 1/38
60/264
(Continued)

FOREIGN PATENT DOCUMENTS

EP 849165 B1 4/2003
GB 926947 5/1963
(Continued)

*Primary Examiner* — Justin Seabe
*Assistant Examiner* — Joshua R Beebe
(74) *Attorney, Agent, or Firm* — Norton Rose Fulbright Canada LLP

(57) ABSTRACT

The structural case has an annular body having a central axis and including a plurality of boss sections circumferentially interspaced from one another around the axis by a plurality of arcuate panel sections, each panel section having: two parallel arcuate structural flange members being axially interspaced from one another; a sheet metal wall extending between and interconnecting the two flange members; and at least one rib having an edge welded to the sheet-metal wall.

6 Claims, 3 Drawing Sheets

(51) Int. Cl.
  *B23K 101/08* (2006.01)
  *B23K 101/04* (2006.01)

(52) U.S. Cl.
  CPC .... *F05D 2230/232* (2013.01); *F05D 2300/10* (2013.01); *Y02T 50/671* (2013.01)

(56) References Cited

U.S. PATENT DOCUMENTS

| | | | |
|---|---|---|---|
| 3,335,483 A * | 8/1967 | Howald | F01D 9/042 |
| | | | 29/447 |
| 3,403,889 A * | 10/1968 | Ciokajlo | F01D 25/162 |
| | | | 415/118 |
| 3,534,556 A | 10/1970 | Wilde | |
| 3,620,009 A | 11/1971 | Wilde | |
| 4,921,401 A * | 5/1990 | Hall | F01D 9/04 |
| | | | 403/28 |
| 5,408,826 A | 4/1995 | Stewart et al. | |
| 5,483,792 A * | 1/1996 | Czachor | F01D 25/162 |
| | | | 60/796 |
| 5,485,723 A | 1/1996 | McCoy et al. | |
| 5,605,438 A | 2/1997 | Burdgick et al. | |
| 6,004,095 A | 12/1999 | Waitz et al. | |
| 6,068,212 A | 5/2000 | Ash et al. | |
| 6,886,342 B2 | 5/2005 | Alkabie | |
| 6,971,841 B2 | 12/2005 | Care | |
| 7,125,217 B2 | 10/2006 | Care | |
| 7,266,941 B2 | 9/2007 | Eleftheriou et al. | |
| 7,370,467 B2 | 5/2008 | Eleftheriou et al. | |
| 7,565,796 B2 | 7/2009 | Eleftheriou et al. | |
| 7,594,405 B2 | 9/2009 | Somanath et al. | |
| 7,739,866 B2 | 6/2010 | Eleftheriou et al. | |
| 7,765,787 B2 | 8/2010 | Eleftheriou et al. | |
| 7,770,378 B2 * | 8/2010 | Eleftheriou | F01D 25/162 |
| | | | 60/226.1 |
| 7,793,488 B2 | 9/2010 | Eleftheriou et al. | |
| 7,797,922 B2 | 9/2010 | Eleftheriou et al. | |
| 7,942,004 B2 | 5/2011 | Hodder | |
| 8,038,386 B2 | 10/2011 | Duchatelle et al. | |
| 8,057,170 B2 | 11/2011 | Latham | |
| 8,272,203 B2 | 9/2012 | Derenes et al. | |
| 8,684,671 B2 | 4/2014 | Froissart et al. | |
| 8,801,376 B2 | 8/2014 | Eleftheriou et al. | |
| 8,926,277 B2 | 1/2015 | Walters | |
| 9,003,852 B2 | 4/2015 | Green et al. | |
| 9,086,077 B2 | 7/2015 | Boufflert et al. | |
| 9,194,258 B2 * | 11/2015 | Durocher | F01D 25/28 |
| 9,316,108 B2 | 4/2016 | Pegan, Jr. et al. | |
| 2005/0042077 A1 * | 2/2005 | Gekht | F01D 9/04 |
| | | | 415/116 |
| 2011/0286839 A1 | 11/2011 | Wojtyczka et al. | |
| 2012/0034076 A1 | 2/2012 | Xie | |
| 2012/0240583 A1 * | 9/2012 | Penz | F23R 3/002 |
| | | | 60/722 |
| 2013/0025151 A1 | 1/2013 | Poy et al. | |
| 2013/0025966 A1 | 1/2013 | Nam et al. | |
| 2013/0236300 A1 | 9/2013 | Hiller et al. | |
| 2014/0016553 A1 | 1/2014 | Nishida et al. | |
| 2014/0113088 A1 | 4/2014 | Goering | |
| 2018/0038244 A1 | 2/2018 | Flatscher et al. | |
| 2018/0066540 A1 | 3/2018 | Blanchard et al. | |
| 2018/0073522 A1 | 3/2018 | Langenbrunner et al. | |

FOREIGN PATENT DOCUMENTS

| | | |
|---|---|---|
| GB | 2471465 A | 1/2011 |
| GB | 2471466 A | 1/2011 |
| WO | WO2009/142552 | 11/2009 |

* cited by examiner

STRUCTURAL CASE FOR AIRCRAFT GAS TURBINE ENGINE

CROSS REFERENCE TO RELATED APPLICATION

This application is a divisional application of U.S. patent application Ser. No. 13/431,121 filed Mar. 27, 2012, the entire content of which is hereby incorporated by reference.

TECHNICAL FIELD

The application relates generally to gas turbine engines and, more particularly, to a structural case for aircraft gas turbine engines.

BACKGROUND OF THE ART

It was known in the art to produce structural cases with flanges and structural ribs which projected radially from a flat annular wall. The use of flanges and ribs is a way to provide structural resistance by adding a relatively small amount of weight as compared to simply increasing the thickness of the wall. In order to be reproducible and to satisfy shape tolerances, ribs were formed by removing material (e.g. milling pockets), leaving the ribs around a pocket and between pockets.

Milling requires specific machinery and results in a relatively high amount of removed material not being used in the final component. Milling is thus a relatively expensive process. Furthermore, milling has a limited precision concerning wall thickness at the bottom of the pockets in a component such as an annular structural case, and the resulting wall thickness can thus have occurrences of thickness variations imparted by the milling step. To be structurally satisfactory, the wall thickness is designed to a given minimal thickness, to which the milling variation thickness is added to ensure the minimal thickness is always present. The designed wall is thus typically thicker than structurally required. This extra 'safety thickness' results in extra weight.

Accordingly, there remains room for improvement in addressing the manufacture of structural cases for aircraft gas turbine engines.

SUMMARY

In one aspect, there is provided a structural case for an aircraft gas turbine engine, said structural case comprising: an annular body having a central axis and including a plurality of boss sections circumferentially interspaced from one another around the axis by a plurality of arcuate panel sections, each panel section having: two parallel arcuate structural flange members being axially interspaced from one another; a sheet metal wall extending between and interconnecting the two flange members; and at least one rib having an edge welded to the sheet-metal wall.

In a second aspect, there is provided a method of making a structural case of an aircraft gas turbine engine, the method comprising: welding an annular sheet metal wall ring between two axially interspaced flange rings, into a panel ring; cutting the panel ring into a plurality of arcuate segments of its circumference, thereby forming a plurality of panel sections having flange members with a sheet metal wall extending therebetween; forming an annular body of a structural case ring by welding a plurality of the panel sections circumferentially between circumferentially interspaced boss sections; and welding at least one rib to the sheet metal wall portion corresponding to each one of the panel sections.

In a third aspect, there is provided an aircraft gas turbine engine comprising a structural case having an annular body having a central axis and including at least one arcuate panel section including a sheet-metal wall surrounded by and interconnecting frame elements including a front and a rear parallel arcuate structural flange members interspaced from one another in the axial direction, and at least one rib having an edge welded to the sheet metal wall.

DESCRIPTION OF THE DRAWINGS

Reference is now made to the accompanying figures, in which.

DETAILED DESCRIPTION

Provided below, in reference to the attached figures, is a complete description of an example of a structural case which is designed for specific use as an intermediate case of a turbofan gas turbine engine as illustrated. It will be understood that alternate embodiments of structural cases can depart from that which is illustrated in order to adapt for alternate turbofan gas turbine engines or alternate types of aircraft gas turbine engines, such as turboprop, turboshaft, etc.

Figure 1:
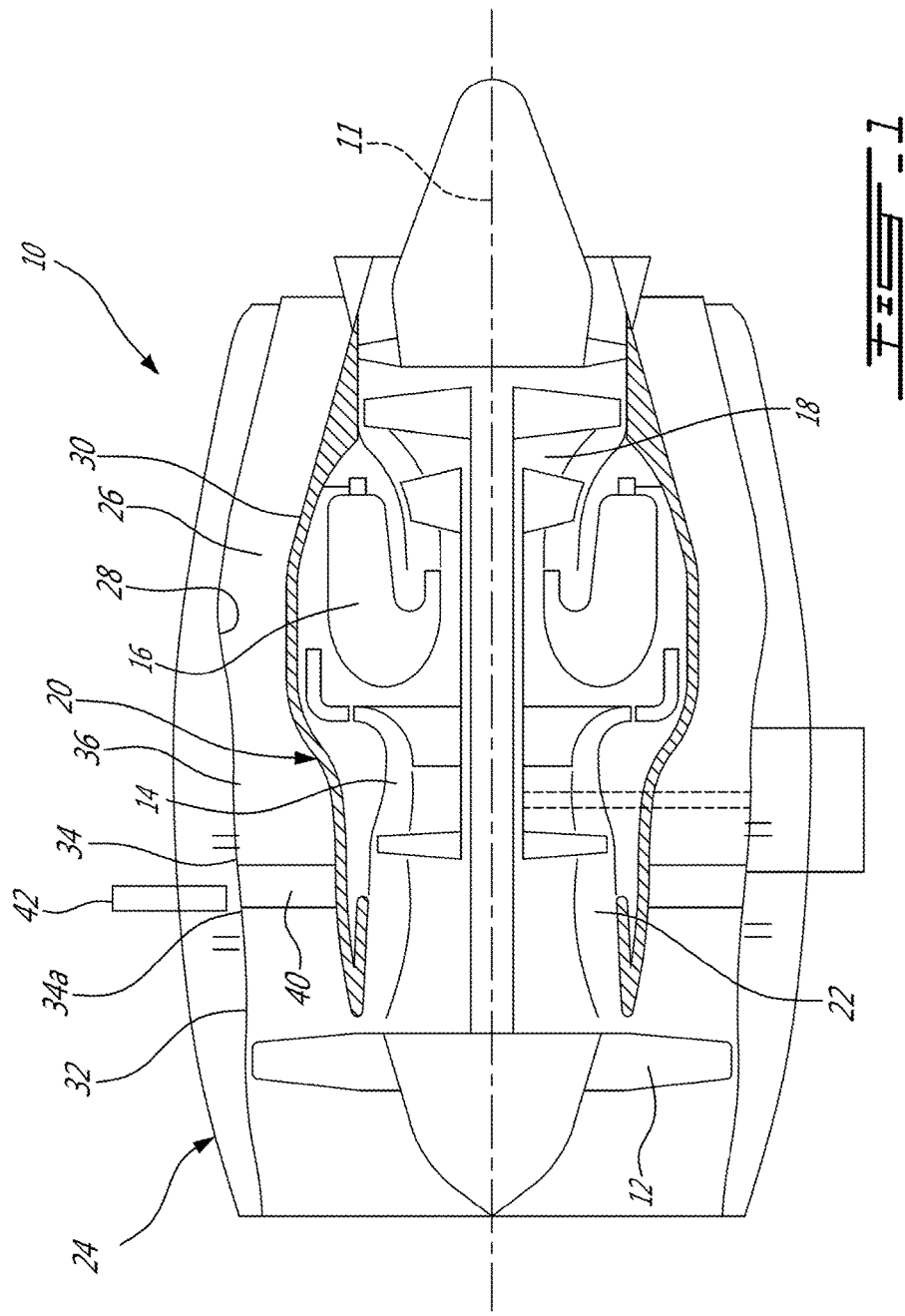
FIG. 1 is a schematic cross-sectional view of a gas turbine engine.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

The fan 12, multistage compressor 14, combustor 16, and turbine section 18 are annular relative an engine axis 11, and housed in an inner casing 20, forming an engine core which has an internal main fluid path 22. The inner casing 20 is coaxially positioned within an outer casing 24 and an annular bypass air passage 26 is defined radially between a radially-inner wall 28 of the outer casing 24 and a radially-outer wall 30 of the inner casing 20, for directing a bypass air flow driven by the fan 12 to pass therethrough.

The inner wall 28 of the outer casing 24 may be formed by three different cases: a fan case 32 surrounds the fan 12 at the front, a bypass duct case 36 extends to the aft, and an intermediate case 34a is assembled between the fan case 32 and the bypass duct case 36, typically by way of bolting flanges thereof together. The intermediate case 34a is referred to herein as a structural case 34 because it forms part of a structure by which loads are transferred. More particularly, the engine core can be mounted to the intermediate case 34a via a front internal mounting structure 40 at a front axial position. The front internal mounting structure 40 can include a plurality of profiled struts or vanes, for instance. The entire engine 10 is mounted to the aircraft (not shown) via an aircraft mounting structure 42 which can also be mounted to the intermediate case 34a. In this embodiment, therefore, among other functions, the intermediate case 34a transfers loads between the front mounting structure 40 and the aircraft mounting structure 42. It will be understood that alternate turbofan engines can further include a rear mounting structure and a corresponding rear structural case, for instance, and that the inner casing can also include a structural case, for instance. In the illustrated embodiments, the front mounting structure 40 transfers thrust, lateral and vertical loads between the engine core and the intermediate case 34a.

Figure 2:
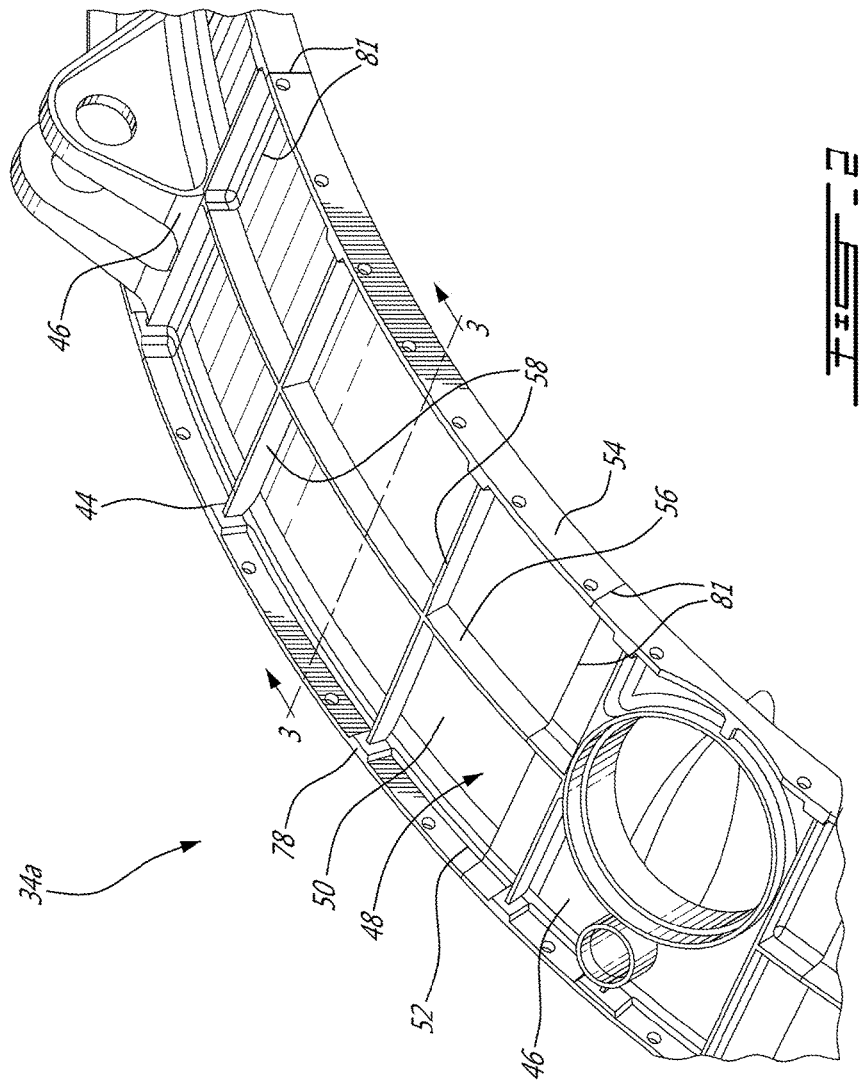
FIG. 2 is an oblique view of a portion of a structural case of the gas turbine engine of FIG. 1.

Turning to FIG. 2, a portion of the intermediate case 34a which forms a structural case 34 for the turbofan gas turbine engine 10 shown in FIG. 1 is shown in greater detail. The intermediate case can be seen to have an annular body 44 including a number circumferentially-extending sections 46, 48. More particularly, the intermediate case has a number of boss sections 46 interspaced circumferentially from one another by panel sections 48 (a single panel section 48 being shown in the portion shown in FIG. 2). The boss sections 46 can have various functions. For instance, a boss section can be used to receive the front mounting structure holding the engine core, a boss section can be used to receive an aircraft mounting structure, and boss sections can also be used as a port or means to convey services to the engine core such as a speed probe, oil feed, and connection to an auxiliary gearbox to name a few examples.

The boss sections 46 may be fully machined to the specific shape associated to their intended function. However, the panel sections 48, which extend between boss sections, have a wall 50 which is formed with an arcuately bent portion of sheet metal which is received between two axially-interspaced flange members 52, 54. A plurality of ribs 56, 58 have an edge welded to the sheet metal wall 50 along their length and project normally therefrom, and are also welded to the flanges 52, 54 or bosses 46 at their ends. The ribs 56, 58 are used as stiffeners to provide added structure. More particularly, ribs which have a length which extends along the circumference of the structural case will be referred to herein as circumferential ribs 56 whereas ribs which extend between the flanges will be referred to herein as axial ribs 58 by comparison to circumferential ribs, although it will be understood that the axial ribs 58 can extend obliquely or axially.

Due to available manufacturing processes (e.g. rolling), sheet metal can be manufactured with very little thickness variations, i.e. very small tolerances. In fact, the thickness tolerances achievable on a steel metal sheet can be significantly better (i.e. provide less dimensional variation) than the thickness tolerances achievable when forming a wall by milling pockets in a large annular steel structure such as a structural case. Henceforth forming a panel section of a structural case with a bended sheet metal wall to which stiffening ribs are added can reduce the amount of extra 'safety thickness' associated with thickness variations compared to forming a structurally similar component by milling, in addition to potentially reducing material waste. By reducing the 'extra safety thickness', weight reductions can be achieved. Further, forming with sheet metal can potentially be less costly than milling.

However, welding is commonly known in the art as a process which has a tendency to impart deformation and/or stress in the components which are so bonded, which makes it counter-intuitive for persons skilled in the art to use in a process of making a structural case for an aircraft engine.

In the illustrated embodiment, the deformations imparted by welding ribs to a sheet metal wall are controlled and limited given the fact that the sheet metal wall is surrounded by a rigid frame prior to welding the ribs.

More particularly, according to an embodiment, prior to welding the ribs 56, 58 thereon, the sheet metal wall 50 which is circumferentially elongated and arcuate, is welded at each axial edge thereof to a corresponding flange member 52, 54, and at each circumferential edge to a corresponding boss portion 46 by corresponding welds 81, and is thus framed between two axially-interspaced flange members 52, 54 and the boss sections 46. The flange members 52, 54 thus constitute front and rear frame elements for the sheet metal wall 50 while the boss sections 46 can provide circumferential frame elements thereto. In this embodiment, the flange members 52, 54 have a shape and orientation which makes them very resistant to radially-exerted loads and which contribute to firmly hold the arcuate shape of the sheet metal wall 50 in position during welding of the ribs 56, 58.

A single circumferential rib 56 may be used for each panel section 48 and extends along the entire circumferential length of the sheet metal wall 50. This circumferential rib 56 can be cut in an arcuate shape from a metal sheet, for instance. A plurality of shorter axial ribs 58 are then used between the circumferential rib 56 and the flanges 52, 54. Typically, all the ribs 58, 56 are placed in position by tacking prior to commencing the welding operation. It can be convenient to position the longer component(s) first and then fit the shorter components in.

According to the illustrated embodiment, it will be noted that the ribs 58, 56 and flanges 52, 54 all extend radially outward and that a smooth and flat surface can thus be provided on the radially inner side 60 (FIG. 3), to allow smooth flowing of the bypass flow. Alternately, if the structural case is adapted to an outer wall of an engine core section, for instance, the ribs and flanges can all be made to extend radially inward to provide a smooth flowing surface in the external bypass flow, for instance.

Figure 3:
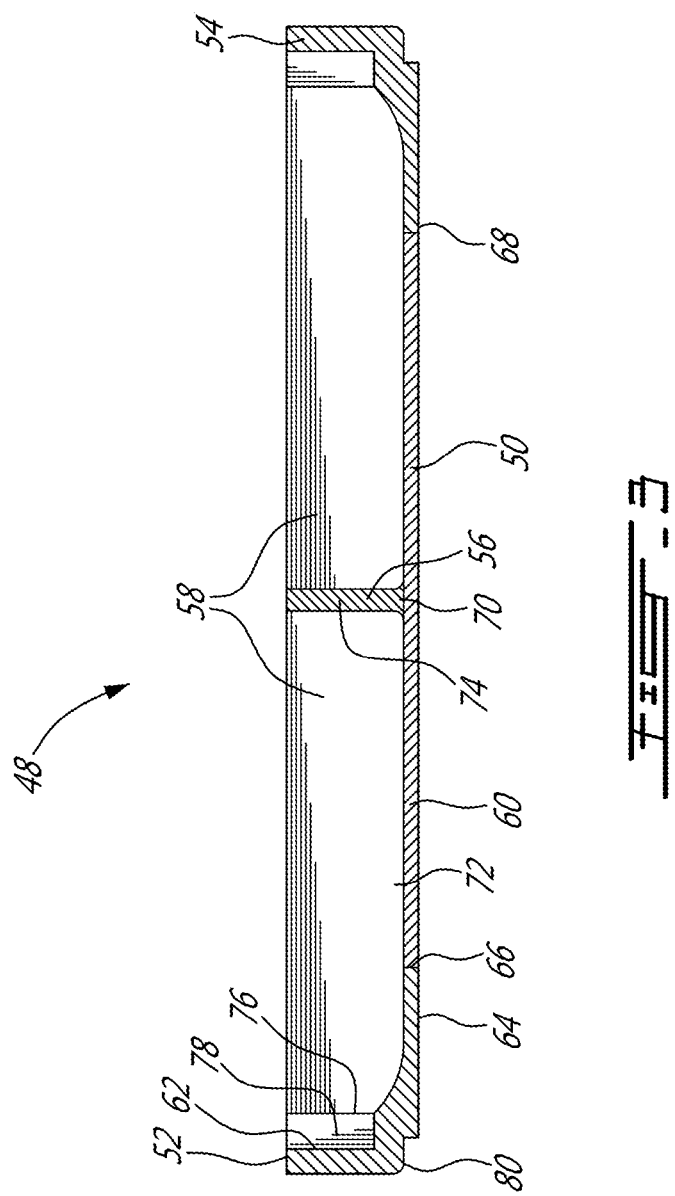
FIG. 3 is a cross-sectional view taken along lines 3-3 of FIG. 2.

Turning more specifically to FIG. 3, the cross-sectional shape of the panel section 48 of this embodiment is shown in greater detail. The sheet metal wall 50 can be seen to extend between the two flange members 52, 54. Each flange member 52, 54 can be seen to have a radially-extending flange portion 62 and an axially-extending foot portion 64. The sheet metal wall 50 is butt-welded at both axial ends 66, 68 to the end of the foot portion 64. Typically, the thickness of the flange portion 62 can be greater than the thickness of the sheet metal wall 50. The thickness of the foot portion 64 can also be made greater than the thickness of the sheet metal wall 50 in order to enable withstanding a greater amount of loads/stress, and can be twice as thick, for instance. A circumferential rib 56 is used in this embodiment in the center, between and parallel to the flange portion 62 of the two flange members 52, 54. The radially-inner edge 70 of the circumferential rib 56 is fillet-welded to the sheet metal wall 50, and the ends can be butt-welded to corresponding portions of the boss sections specifically designed to this end, for instance, as shown in FIG. 2. Axial ribs 58 are seen with their radially inner edge 72 fillet-welded along a portion of the axial width of the sheet metal wall 50, an inner one of their ends 74 being welded to the circumferential rib 56 and an outer one 76 of their ends being welded to a corresponding frame member 52 or 54. More particularly, a portion of the edge 72 of the axial ribs 58 is also welded to the foot portion 64 of the frame member in this embodiment, and the outer end 76 can be welded to an inward projection 78 of the flange portions 62 provided between recesses which can be provided to house bolt heads or nuts of bolts used to secure the flange portions 62 to corresponding portions of adjacent cases (e.g. fan case or bypass duct). The flange members 52, 54 can be machined with a recess 80 in the outer corner which forms a spigot allowing snug mating of adjacent casing components in a manner to provide a smooth surface with low airflow resistance exposed to fluid flow. Alternate embodiments can have more than one circumferential rib and axial ribs extending between adjacent circumferential ribs, for instance. Alternate embodiments can also have continuous axial ribs extending between the flange members and discontinuous circumferential ribs having portions extending between the continuous axial ribs, for instance.

In the illustrated embodiment, satisfactory accuracy (shape tolerances) was achieved and maintained after welding the ribs. The structural case was built using the following steps:

First, a panel ring was formed, from which arcuate panel sections were obtained by cutting arcuate segments from its circumference. A sheet metal wall ring was formed by bending a sheet metal having the desired width into an annulus of a given diameter. Flange rings were formed by machining. The sheet metal wall ring was welded between the flange rings into what will be referred to as the panel ring, forming the flange and sheet metal wall arrangement of the panel sections to be obtained from the panel ring. Given that the flanges are in the shape of a ring at this point, the flange rings form a rigid closed structure without free ends and the welding operation can be done with a relatively high degree of accuracy and dimensional precision. This was done in a relatively simple jig.

Then, the so-formed panel ring was cut into arcuate sections of its circumference referred to as panel sections. The cutting was done along a radial/axial plane relative to the panel ring axis, and the panel sections can thus have axially straight circumferential ends shaped to fit with a corresponding shape of boss sections. Such straight cuts were found to preserve the dimensional integrity of the panel section and can be favoured for simplicity and accuracy, but more complex cutting shapes are also possible in alternate embodiments.

After cutting the panel sections, the segmented portions of the flange ring become the flange members and the segments of the sheet metal wall ring become the sheet metal wall of the panel sections.

The boss sections can be fully formed by machining, and have circumferential ends which match with the circumferential ends of the panel sections.

Then, a number of the panel sections are welded between corresponding ones of the boss sections to form an annular body of a structural case. The boss sections are interspersed relative to panel sections, i.e. each boss section has a panel section at each end and vice-versa.

Ribs were then welded to strengthen the sheet metal walls of the panel sections. Depending on the width of the structural case, axial ribs can extend directly along the entire width of the sheet metal walls, between the two flange members. Alternately, one or more circumferential rib can be welded to the sheet metal wall between the two flange members, and the axial ribs can extend from a corresponding flange member to the circumferential rib, or if there are two or more circumferential ribs, between adjacent circumferential ribs. The axial ribs can extend parallel to the axis, or can extend obliquely, for instance. All the ribs can be cut from sheet metal, for instance.

Once the welding operations are finished, or if deemed required at any time during the method of making the structural case, the components can be placed in an oven to receive a stress-relief thermal treatment, for instance.

The above description is meant to be exemplary only, and one skilled in the art will recognize that changes may be made to the embodiments described without departing from the scope of the invention disclosed. For example, many types of aircraft gas turbine engines (turboprop, turbofan, turboshaft, etc.) have an annular structural casing designed to transfer loads. The load transfer can occur between the engine and the aircraft, or between engine components for instance. Some engine types can even have more than one structural case. In alternate embodiments, the teachings of this specification can be applied to various types of structural cases and/or alternate types of aircraft gas turbine engines, and are not limited to intermediate cases of a turbofan engine. Further, in the embodiments described above, the welded material is steel, but in alternate embodiments other metals can be used, such as titanium or nickel for instance. Finally, although in the simple embodiment described above the sheet metal has a cylindrical portion shape, it will be understood that other shapes can be used in alternate embodiments such as conical portion shape, or more complex annular shapes for instance. Still other modifications which fall within the scope of the present invention will be apparent to those skilled in the art, in light of a review of this disclosure, and such modifications are intended to fall within the scope of the appended claims.

What is claimed is:

1. A method of making a structural case of an aircraft gas turbine engine, the method comprising:
    first, welding a sheet metal wall ring between two axially interspaced flange rings, into a panel ring;
    second, cutting the panel ring into a plurality of arcuate segments of its circumference, thereby forming a plurality of panel sections having flange members with a sheet metal wall extending therebetween;
    third, forming an annular body of a structural case ring by welding a plurality of the panel sections circumferentially between circumferentially interspaced boss sections; and then
    welding at least one rib to the sheet metal wall portion corresponding to each one of the panel sections.

2. The method of claim 1 wherein the step of welding at least one rib includes, for each panel section:
    welding an edge of a circumferential rib to the sheet metal wall and welding both ends thereof to corresponding ones of the boss sections.

3. The method of claim 2 wherein the step of welding at least one rib further includes, for each panel section:
    welding an edge of at least one axial rib to the sheet metal wall, welding a first end thereof to the circumferential rib and welding a second end thereof to a corresponding portion of the flange rings.

4. The method of claim 1, wherein the panel sections are interspaced with the boss sections with each boss section affixed between two corresponding panel sections.

5. The method of claim 1, wherein the annular sheet metal wall ring is butt welded to the flange rings.

6. The method of claim 1, wherein the flange rings and the at least one rib project radially from the sheet metal wall in a same radial direction, opposite to a smooth annular radial face of the sheet metal wall.

* * * * *